Figure 1:
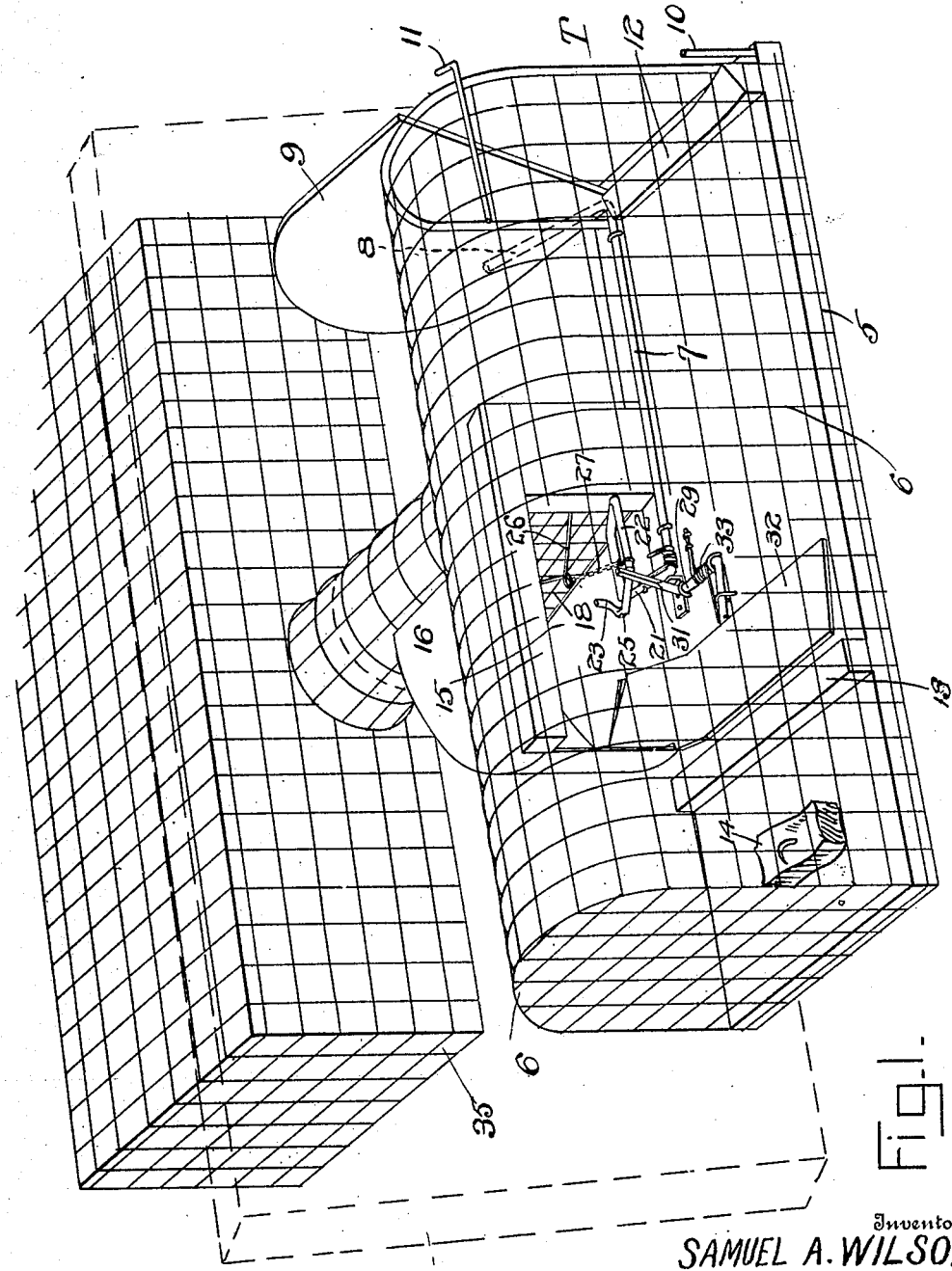

S. A. WILSON.
ANIMAL TRAP.
APPLICATION FILED OCT. 12, 1908.

914,000.

Patented Mar. 2, 1909.
2 SHEETS—SHEET 1.

Inventor
SAMUEL A. WILSON,

Witnesses

By Wm. Bagger & Co.,
Attorneys.

S. A. WILSON.
ANIMAL TRAP.
APPLICATION FILED OCT. 12, 1908.
914,000.
Patented Mar. 2, 1909.
2 SHEETS—SHEET 2.
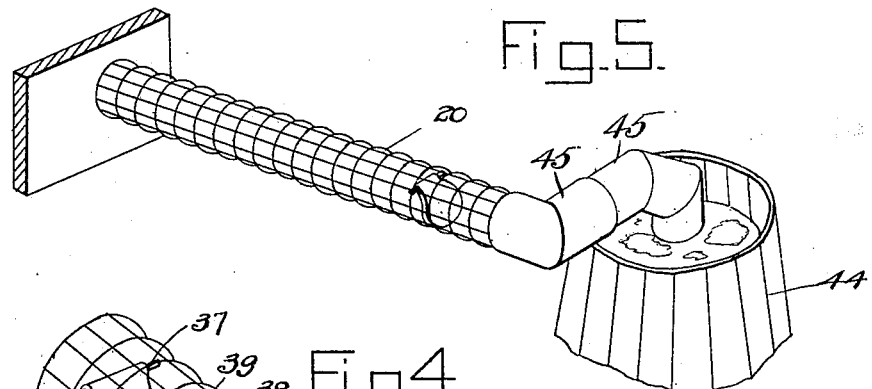
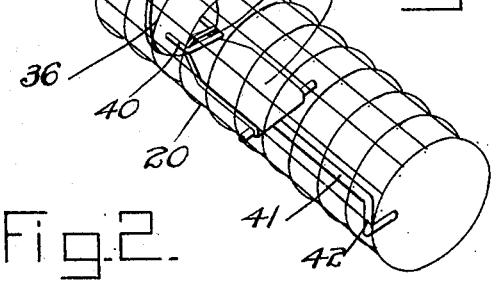
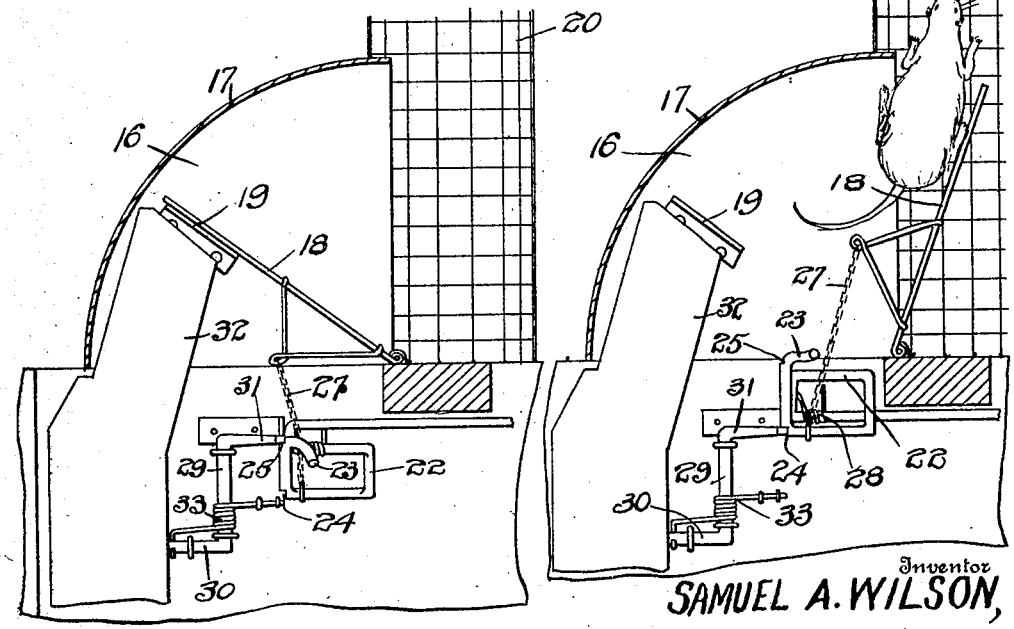
Inventor
SAMUEL A. WILSON,

UNITED STATES PATENT OFFICE.

SAMUEL A. WILSON, OF ESTHERVILLE, IOWA.

ANIMAL-TRAP.

No. 914,000. Specification of Letters Patent. Patented March 2, 1909.

Application filed October 12, 1908. Serial No. 457,360.

*To all whom it may concern:*

Be it known that I, SAMUEL A. WILSON, a citizen of the United States, residing at Estherville, in the county of Emmet and State of Iowa, have invented certain new and useful Improvements in Animal-Traps, of which the following is a specification.

This invention relates to animal traps of that class in which each animal that is caught or impounded in the trap operates to reset the trap for the next animal.

The invention has for its object to provide an improved locking and latching mechanism whereby the door of the trap will be locked, when closed, and will be sustained in position, when open.

A further object of the invention is to provide an improved trigger mechanism for springing the trap.

A further object of the invention is to improve the mechanism whereby the trap is reset by the animal passing from the trap box proper to the receiving compartment.

Still further objects are to simplify and improve the construction and operation of this class of devices.

With these and other ends in view which will readily appear as the nature of the invention is better understood, the same consists in the improved construction and novel arrangement of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings—Figure 1 is a perspective view of an animal trap constructed in accordance with the invention. Fig. 2 is a detail plan view showing the trigger mechanism and related parts as it appears when the trap is sprung and locked. Fig. 3 is a detail plan view of the trigger mechanism and related parts as it appears when the trap is set by an animal passing from the trap body to the receiving compartment. Fig. 4 is a perspective detail view of a portion of the passage leading from the trap box to the receiving compartment. Fig. 5 is a perspective detail view of the passage leading from the trap box, and showing a modification of the receiving compartment.

Corresponding parts in the several figures are denoted by like characters of reference.

The trap box proper may be of any desired shape and dimensions, and it may be constructed in any suitable manner; in the drawings there has been shown a trap box T of elongated approximately rectangular shape having a wooden bottom 5, and a body, the walls and top portion 6 of which are constructed of wire netting. Upon the bottom 5, adjacent to one of the side walls, a rock shaft 7 is supported in suitable bearings; said rock shaft being provided at its front end with an upturned arm 8, upon which is securely attached a door 9, constituting a closure for the open front end of the trap box. It will be observed that by oscillating the rock shaft the door 9 may be moved to an open position, as indicated in Fig. 1, or it may be moved into alinement with the trap box so as to obstruct the opening of the front end of the latter.

Adjacent to the front end of the trap box is secured a post or upright 10 which, when the door is closed will obstruct the free edge thereof and prevent it from being pushed open by an animal impounded in the trap; the trap box is also provided with a hook 11, located at the open front end thereof and designed to obstruct the free edge of the door to prevent it from being forced open.

Upon the floor of the trap box, adjacent to the open front end is arranged a cleat 12 that extends transversely across the floor adjacent to the door, which latter, when closed, will thus be confined between the front end of the trap box and the cleat 12, adjacent to the rear side, and the post 10 and the hook 11, adjacent to its front side; and said door will thus be held very securely against lateral displacement either forwardly or rearwardly.

Upon the floor of the trap box, near the inner or rear end of said box, is arranged a transverse cleat 13, and in the space between said cleat and the rear end of the box bait 14 of any kind may advantageously be placed. The side of the trap box adjacent to which the rock shaft 7 is arranged is provided intermediate its ends, and slightly in advance of the cleat 13 with an exit opening or aperture 15 adjacent to which, and exteriorly upon the trap box, there is secured a segmental chamber or passage 16, having a curved or arcuate wall 17, extending approximately through ninety degrees of a circle. The chamber or passage is obstructed by a door or closure 18, which is hingedly supported, upon a vertical axis, adjacent to the front edge of the exit aperture 15; the floor of the chamber or passage 16, being provided with a cleat or flange 19, constituting a stop which is located at some little distance from the wall of the trap box, and which will obstruct the door 18 and prevent the latter from swinging within the trap box; the forward end of the segmental chamber or passage 16 communicates with a tubular passage 20, the inner end of which is connected with the side wall of the trap box and is obstructed thereby, and it will be observed that the door or closure 18 is free to swing within the tubular passage 20, as will be clearly seen in Fig. 3 of the drawings.

The rock shaft 7 is provided at its inner or rear end with a radially extending arm 21, carrying a rectangular frame 22, provided at its rear inner corner, whereby is meant the rear corner which lies adjacent to the exit aperture of the trap box, with an upwardly and forwardly inclined arm 23; it will be observed that the rock shaft 7 with its arms 8 and 21, frame 22 and arm 23 may be very easily and inexpensively manufactured by bending the same from a piece of wire of suitable thickness. The rear side of the frame 22, is provided with notches 24 and 25, formed respectively at the outer and inner corners of the frame, the arm 23 being in the nature of a guide disposed adjacent to the notch 25. The swinging door 18 is provided with a bracket 26, which is connected by a flexible connection, such as a chain 27 with the frame 22; said chain being preferably attached to or connected with the outerside-member of said frame, the arm or guide member 23 serving to prevent the chain from slipping over the rear end of the frame 22, thus preventing any possible entanglement of said chain with the trigger mechanism, which will be presently described as operating in conjunction with the notches 24, 25. A suitably constructed spring 28, which may be coiled upon the rock shaft 7, exerts its tension against the radial arm 21, of said rock shaft, which latter is thereby impelled to assist in effecting the closure of the door 9 at the front end of the trap box; said closure being originally effected by gravity of the door except when the center of gravity of the latter is moved beyond the axis of the rock shaft. The said spring will thus also operate to keep the swinging door 18 normally within the segmental passage 16, while at the same time it will permit the said door to move within the passage 20 in order to permit an animal to force its way from the said segmental passage 16 into the tubular passage 20.

Supported in suitable bearings upon the frame of the trap box adjacent to the inner end of the rock shaft 7, and approximately at right angles to the latter, is a rock shaft 29, having radially extending arms 30 and 31, the former of which carries a treadle 32 that extends transversely across the trap box and is normally kept in a position slightly raised above the floor of the trap box by the action of the spring 33, which is coiled upon the rock shaft 29, and exerts its tension against the under side of the arm 30; the arm 31 extends upwardly from the rock shaft 29 and constitutes a trigger that lies in the path of and is adapted for engagement with the notches 24 and 25 of the frame 22; the arm 23, in addition to confining the chain or flexible connection 27 upon the frame 22, constitutes an extension of said frame adjacent to the notch 25, and serves, in a measure, to guide the trigger member 31 into engagement with said notch when the frame 22 is tilted in an outward direction. The spring 33 which operates to maintain the treadle 32 in a raised position also serves to maintain the trigger in locked engagement with either of the notches 24 or 25, as the case may be; and it will be seen that when the regular shaft 7 is in a position where the trap door 9 is open, as in Fig. 1, it will be retained in such position by the trigger arm 31, engaging the notch 24, while, when the door 9 is in a closed position, the notch 25 will be engaged by the trigger arm. In the latter position the trigger arm will be maintained by the tension of the spring 33, upon the arm 30 of the rock shaft 29, and when the parts are in this position the trap may not be opened until the rock shaft 29 has been oscillated, by downward pressure upon the treadle 32 or otherwise, to effect the disengagement of the trigger arm from the notch 25. The treadle 32 extends through the exit aperture 15 well within the segmental compartment 16, terminating adjacent to the cleat or stop member 19 upon the floor of said compartment.

In arranging the improved trap for catching vermin such as rats which are wellknown to possess acute reasoning powers and which are readily deterred from entering a trap in case they shall see a number of their kind already caught and confined in the trap, it is preferred to arrange the trap box T, adjacent to one side of a wall or partition as indicated at P, in Fig. 1 of the drawings, said wall being provided with an opening for the accommodation of the tubular passage 20, one end of which, as hereinbefore stated; communicates with the segmental passage or compartment 16. The opposite end of the passage 20, is connected with a box 35, which constitutes a receiving compartment and which may be of any desired dimensions; said box being preferably made large enough to hold a considerable number of animals. This box, or receiving compartment, being located at the side of the partition P opposite to the trap box proper, will be invisible to animals approaching the trap box who will thus be less liable to be frightened by the animals already caught and confined. For the purpose of preventing the animals from returning from the receiving box 35, to the trap box, it is preferred to arrange at a suitable point within the passage 20, a swinging door 36, supported at its upper edge upon a transverse rock shaft 37; the door 36 is made of such dimensions that its lower edge will abut upon the bottom of the tubular passage 20, but as a safeguard and to prevent it from being pushed open by the animals it is preferred to employ a latch comprising a pivotally supported trigger or treadle 38 having at one end a hook 39, engaging a staple 40 upon the door, and provided with an arm 41, constituting a counterweight whereby the hook 39 is kept in engagement with the staple 40; the arm 41 is provided with a terminal downturned projection 42 adapted to engage the bottom of the passage 20, for the purpose of maintaining the parts in proper working relation. It will be readily seen that the weight of an animal upon the treadle 38, will disengage the hook 39 from the staple 40 and enable the door 36 to be pushed open to admit of the passage of an animal beneath said door; the animal having passed the door will, by gravity, swing shut, and the hook 39, which is inclined or beveled as shown, will be engaged by the staple 40, and the parts will thus be automatically locked in such a manner that the door may not be pulled open by an animal attempting to return in the direction of the trap box.

In Fig. 5 of the drawings has been illustrated a slight modification under which, instead of the receiving box or compartment 35, there is employed a vessel such as a barrel 44, containing water or other liquid into which the tubular passage 20 is made to discharge; said passage being provided with several joints or elbows 45 combining to form a tortuous passage which will prevent the animals from perceiving the ultimate destination until, by an abrupt downward turn, the end of the passage is made to drop into the barrel or receptacle 44. By the employment of this form of invention the animals will be destroyed by drowning as rapidly as they are caught.

From the foregoing description taken in connection with the drawings hereto annexed, the operation and advantages of this invention will be readily understood.

The improved trap is particularly intended to be used as a rat trap, although it is obvious that the principles upon which the trap is constructed may be utilized for trapping other animals. The construction is simple and inexpensive, and the device will be found to be thoroughly efficient for the purposes for which it is provided.

Having thus described the invention, what is claimed is:

1. A trap box open at one end, a rock shaft supported longitudinally in the box, a door supported by the rock shaft and adapted to swing adjacent to the open end of the box, and latch means for maintaining the rock shaft in different positions with the door open or closed, as required.

2. A trap box open at one end, a rock shaft supported longitudinally in the box and carrying a door at one end, an arm extending radially from the rock shaft, a rectangular frame supported by said arm and having notches adjacent to its rear corners, an inclined guide arm adjacent to the notch at the inner corner of the frame, a spring actuated rock shaft supported at an angle to the door-carrying rock shaft and having a treadle, a trigger arm extending from the spring actuated treadle carrying rock shaft and engaging the notches in the rectangular frame, and means for oscillating the door carrying rock shaft.

3. A trap box open at one end and having a laterally extending segmental exit passage and an exit tube communicating therewith, a door supported hingedly at its front edge and adapted to swing in an approximately horizontal plane within the segmental passage and into the exit tube, an obstruction in the segmental passage to prevent the door from swinging within the trap box, a rock shaft supported longitudinally in the trap box carrying a door adapted to obstruct the opening at the front end of the box, an arm extending from the rock shaft and carrying a rectangular frame having notches at its rear corners, a flexible connection between said frame and the door obstructing the exit, a spring actuating the rock-shaft to close the door at the inlet of the trap, a spring actuated rock shaft supported adjacent to the inner end of the door carrying rock shaft and at an angle thereto, a treadle supported by the spring actuated rock shaft, and a trigger arm extending radially from the latter and lying in the path of the notches in the rectangular frame supported by the door carrying rock shaft.

4. A trap box open at one end and having a laterally extending segmental exit passage, and an exit tube connected with the latter, a door supported for swinging movement in an approximately horizontal plane in the segmental exit passage and partly within the exit tube, an obstruction for said door within the segmental passage, a spring actuated treadle extending transversely through the trap box and within the segmental exit chamber terminating adjacent to the obstruction in the latter, a rock shaft supported in the trap box and carrying a door to obstruct the entrance to the trap, an arm extending laterally from the door-carrying rock shaft, a rectangular frame supported by said arm and having notches adjacent to its rear corners and an inclined guide member adjacent to the inner notch, a flexible connection between the rectangular frame and the exit door, a spring actuating the door carrying rock shaft to shut the door, and a trigger member connected with the spring actuated treadle and adapted for engagement with the notches at the rear corners of the rectangular frame supported by the door carrying rock shaft.

5. In an animal trap, a trap box having an inlet and exit, a rock shaft having a radially extending member, an oscillatory door carried by the rock shaft to obstruct the inlet, a swinging door obstructing the exit, a flexible connection between the exit obstructing door and the radially extending member of the rock shaft carrying the inlet obstructing door, whereby the latter will be swung open when the exit obstructing door is forced open in an outward direction, and latch means for securing the inlet obstructing door open or shut as the case may be.

In testimony whereof I affix my signature in presence of two witnesses.

SAMUEL A. WILSON.

Witnesses:
F. R. WOODS,
CHAS. A. ROOT.